United States Patent
Kuhn et al.

(10) Patent No.: US 12,442,453 B2
(45) Date of Patent: Oct. 14, 2025

(54) ELASTOMER-MOUNTED SPLIT RING

(71) Applicant: Caterpillar Inc., Peoria, IL (US)

(72) Inventors: Ralf Kuhn, Lünen (DE); Sebastian Lammers, Lünen (DE)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 18/020,401

(22) PCT Filed: Aug. 4, 2021

(86) PCT No.: PCT/EP2021/025299
§ 371 (c)(1),
(2) Date: Feb. 8, 2023

(87) PCT Pub. No.: WO2022/033720
PCT Pub. Date: Feb. 17, 2022

(65) Prior Publication Data
US 2023/0272861 A1    Aug. 31, 2023

(30) Foreign Application Priority Data

Aug. 12, 2020   (GB) ..................................... 2012541

(51) Int. Cl.
*F16K 3/34*    (2006.01)
*F15B 13/04*   (2006.01)
*F16K 3/26*    (2006.01)

(52) U.S. Cl.
CPC ............ *F16K 3/34* (2013.01); *F15B 13/0401* (2013.01); *F16K 3/265* (2013.01)

(58) Field of Classification Search
CPC .......... F16K 3/265; F16K 3/34; F15B 15/222; F15B 15/223; F15B 15/224; F16J 15/222; F16J 15/223; F16J 15/224

USPC .................................. 251/1.1, 1.3, 325, 363
See application file for complete search history.

(56) References Cited

U.S. PATENT DOCUMENTS

| | | | |
|---|---|---|---|
| 2,797,945 A * | 7/1957 | Monahan ............. | F16J 15/3208 277/580 |
| 2,962,331 A * | 11/1960 | Folkerts .................. | B62D 5/24 277/910 |
| 2,968,501 A * | 1/1961 | Tisch ...................... | F16J 15/32 285/918 |
| 3,426,998 A * | 2/1969 | Kintner .................. | F16K 3/243 251/324 |

(Continued)

FOREIGN PATENT DOCUMENTS

| | | |
|---|---|---|
| AT | 522124 A1 | 8/2020 |
| DE | 29615799 U1 | 10/1996 |

(Continued)

OTHER PUBLICATIONS

JP-2003311650-A. Translation (Year: 2003).*

(Continued)

*Primary Examiner* — Daphne M Barry

(57) ABSTRACT

The present invention pertains to a split ring assembly for adjusting the throughput of a fluid of a hydraulic valve comprising an elastomeric element being adapted to mount a split ring around a hydraulic ram, wherein the elastomeric element is arranged around the outward circumference of the split ring, wherein the throughput of the fluid is adjustable depending on the degree to which the throughput of hydraulic fluid is limited by the split ring.

13 Claims, 3 Drawing Sheets

(56) References Cited

U.S. PATENT DOCUMENTS

| | | | | |
|---|---|---|---|---|
| 4,296,675 | A * | 10/1981 | Gies | F15B 15/222 |
| | | | | 277/580 |
| 4,424,737 | A * | 1/1984 | Endo | F16F 9/49 |
| | | | | 285/276 |
| 4,764,035 | A * | 8/1988 | Boyd | F16C 27/063 |
| | | | | 384/909 |
| 4,878,766 | A * | 11/1989 | Boyd | F16C 33/74 |
| | | | | 384/140 |
| 6,299,127 | B1 | 10/2001 | Wilson | |
| 6,299,219 | B1 * | 10/2001 | Hoegger | F16L 27/0828 |
| | | | | 285/190 |
| 6,523,452 | B2 * | 2/2003 | Dougami | F15B 15/222 |
| | | | | 91/394 |
| 7,341,258 | B2 * | 3/2008 | Holt | F16J 15/166 |
| | | | | 277/584 |
| 7,900,549 | B2 * | 3/2011 | Kobayashi | F15B 15/222 |
| | | | | 91/394 |
| 8,690,534 | B1 * | 4/2014 | Janocko | F16J 15/164 |
| | | | | 277/508 |
| 9,593,697 | B2 * | 3/2017 | Baalmann | F16F 9/49 |
| 11,493,064 | B2 * | 11/2022 | Akita | F15B 15/149 |
| 2009/0084257 | A1 * | 4/2009 | Buckley | F15B 15/224 |
| | | | | 37/442 |
| 2014/0374640 | A1 * | 12/2014 | Nalini | F16K 3/262 |
| | | | | 251/326 |
| 2016/0273559 | A1 * | 9/2016 | Takai | F15B 15/222 |
| 2016/0305550 | A1 | 10/2016 | Hague et al. | |

FOREIGN PATENT DOCUMENTS

| | | | | |
|---|---|---|---|---|
| EP | 3124730 | A1 | 2/2017 | |
| GB | 2485909 | A | 5/2012 | |
| JP | 2003311650 | A * | 11/2003 | B25D 11/125 |

OTHER PUBLICATIONS

International Search Report related to Application No. PCT/EP2021/025299; reported on Nov. 18, 2021.
Great Britain Search Report related to Application No. 2012541.5; reported on Jan. 21, 2021.

* cited by examiner

ELASTOMER-MOUNTED SPLIT RING

CROSS-REFERENCE TO RELATED APPLICATION

This Application is a 35 USC § 371 US National Stage filing of International Application No. PCT/EP2021/025299 filed on Aug. 4, 2021 which claims priority under the Paris Convention to Great Britain Patent Application No. 2012541.5 filed on August 12. 2020.

TECHNICAL FIELD

The present invention pertains to a split ring assembly for adjusting the throughput of a fluid of a hydraulic valve and a hydraulic valve with such a split ring assembly.

TECHNOLOGICAL BACKGROUND

Hydraulic valves control the volume flow in a hydraulic system. The control ranges from targeted flow limitation to complete shut-off The valve comprises adjustment elements to regulate the flow of the hydraulic fluid. For example, the flow of hydraulic fluid is regulated by a split ring which regulates the throughput of hydraulic fluid in a hydraulic ram comprising outlets for guiding hydraulic fluid. The split ring is controlled such that it can regulate the targeted flow passing the outlets.

The rapid wear of regulating elements such as split rings is a problem and can affect the reliability of the valves. For example, such valves are used in (water) hydraulic machines, such as boosters. The split ring passes over pressurized outlets. Each time the split ring passes over the pressurized outlets it is exposed to high loads. The problem is characterized by greatly increased wear, up to the total destruction of the split ring when passing these holes.

Accordingly, hydraulic valves for adjusting the throughput of a fluid may still be improved, in particular in regard of durability.

SUMMARY OF THE INVENTION

Starting from the prior art, it is an objective to provide an improved split ring assembly and a hydraulic valve with such a split ring assembly, which particularly improves the durability of the hydraulic valve.

This objective is solved by means of a split ring assembly and a hydraulic valve with the features of claim 1 or claim 4. Preferred embodiments are set forth in the present specification, the Figures as well as the dependent claims.

Accordingly, a split ring assembly for adjusting the throughput of a fluid of a hydraulic ram comprising an elastomeric element being adapted to mount a split ring around the hydraulic ram, wherein the elastomeric element is arranged around the outward circumference of the split ring, wherein the throughput of the fluid is adjustable depending on the degree to which the throughput of hydraulic fluid is limited by the split ring.

Further, a hydraulic valve comprising a split ring assembly and a hydraulic ram is provided, wherein the split ring assembly is mounted around the hydraulic ram, wherein the degree of throughput of hydraulic fluid is adjustable depending on the degree to which the throughput of hydraulic fluid is limited by the split ring.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
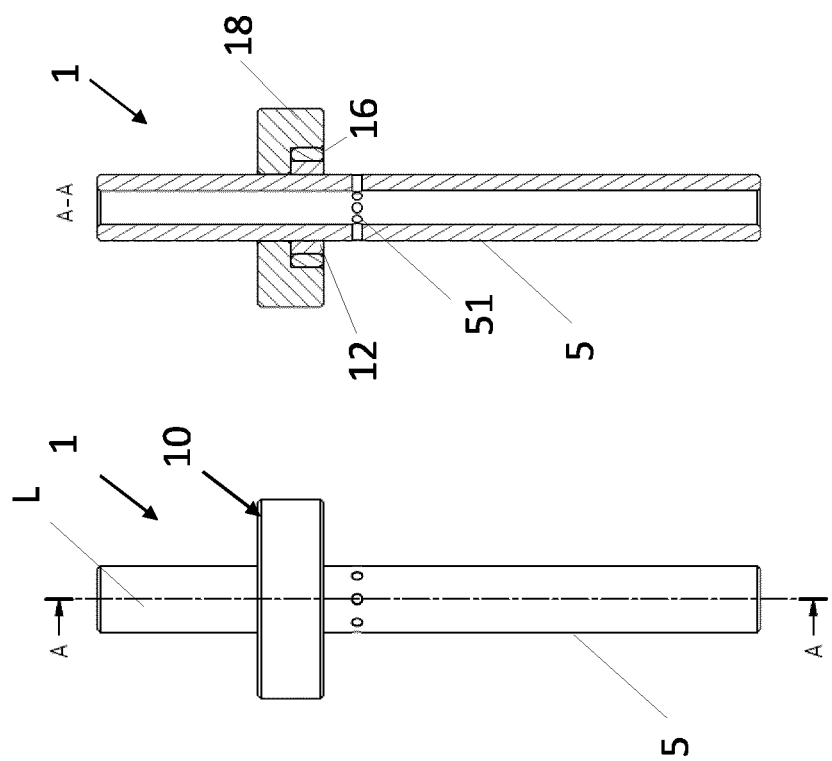
FIG. 1 schematically shows a hydraulic valve with a split ring assembly according to an embodiment.
Figure 1:
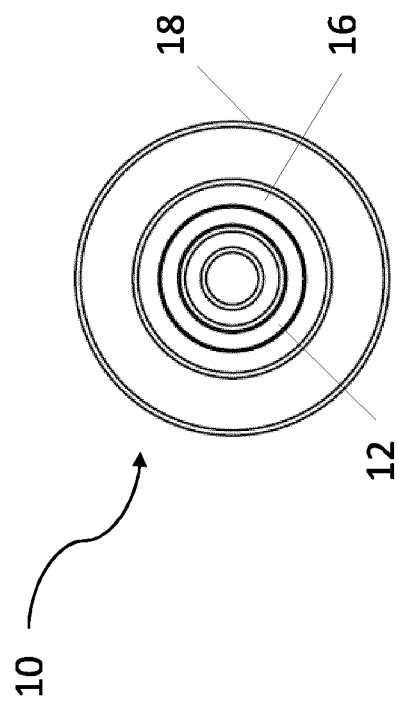

In the following, the invention will be explained in more detail with reference to the accompanying figures. In the Figures, like elements are denoted by identical reference numerals and repeated description thereof may be omitted in order to avoid redundancies.

Figure 2:
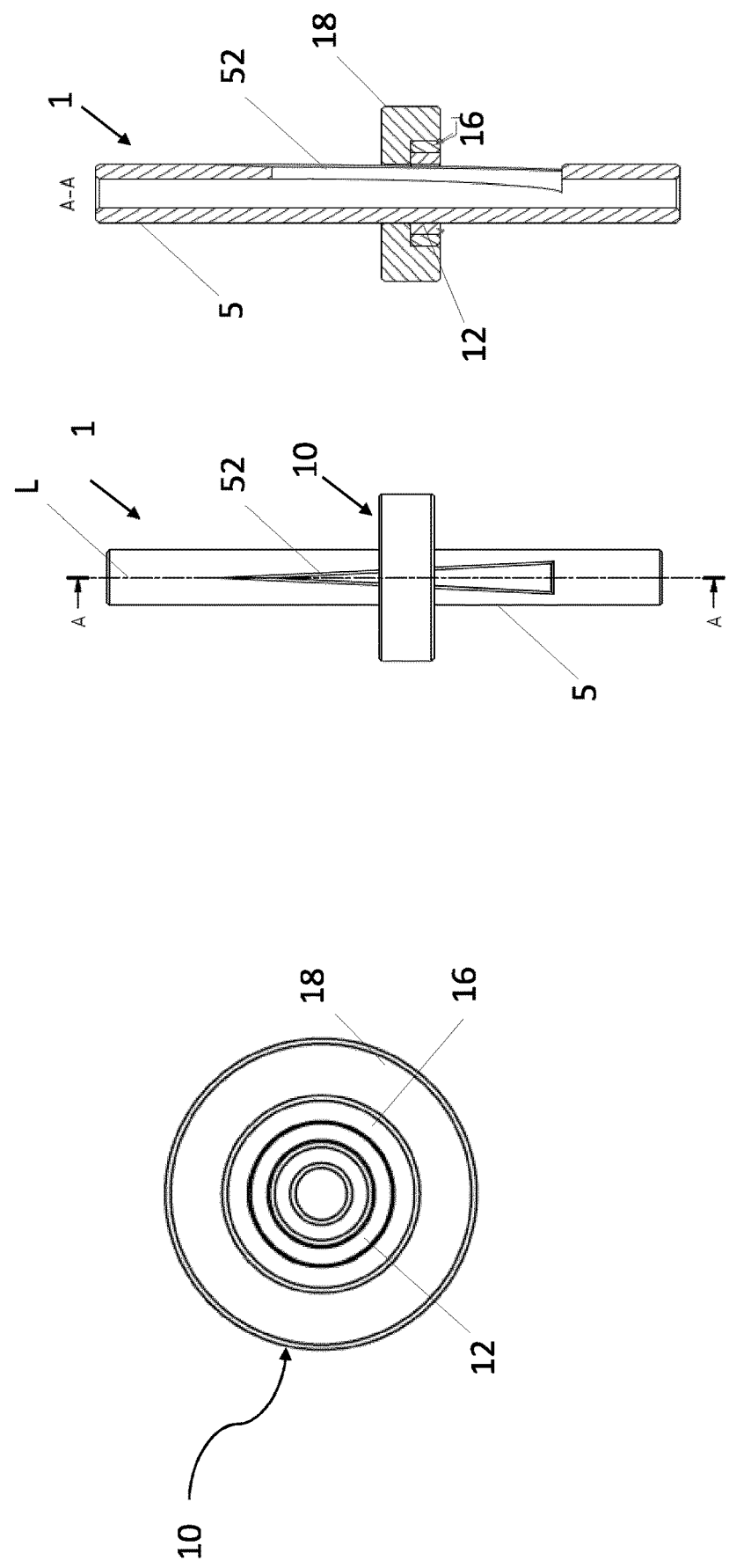
FIG. 2 schematically shows a hydraulic valve with a split ring assembly according to another embodiment.
Figure 3:
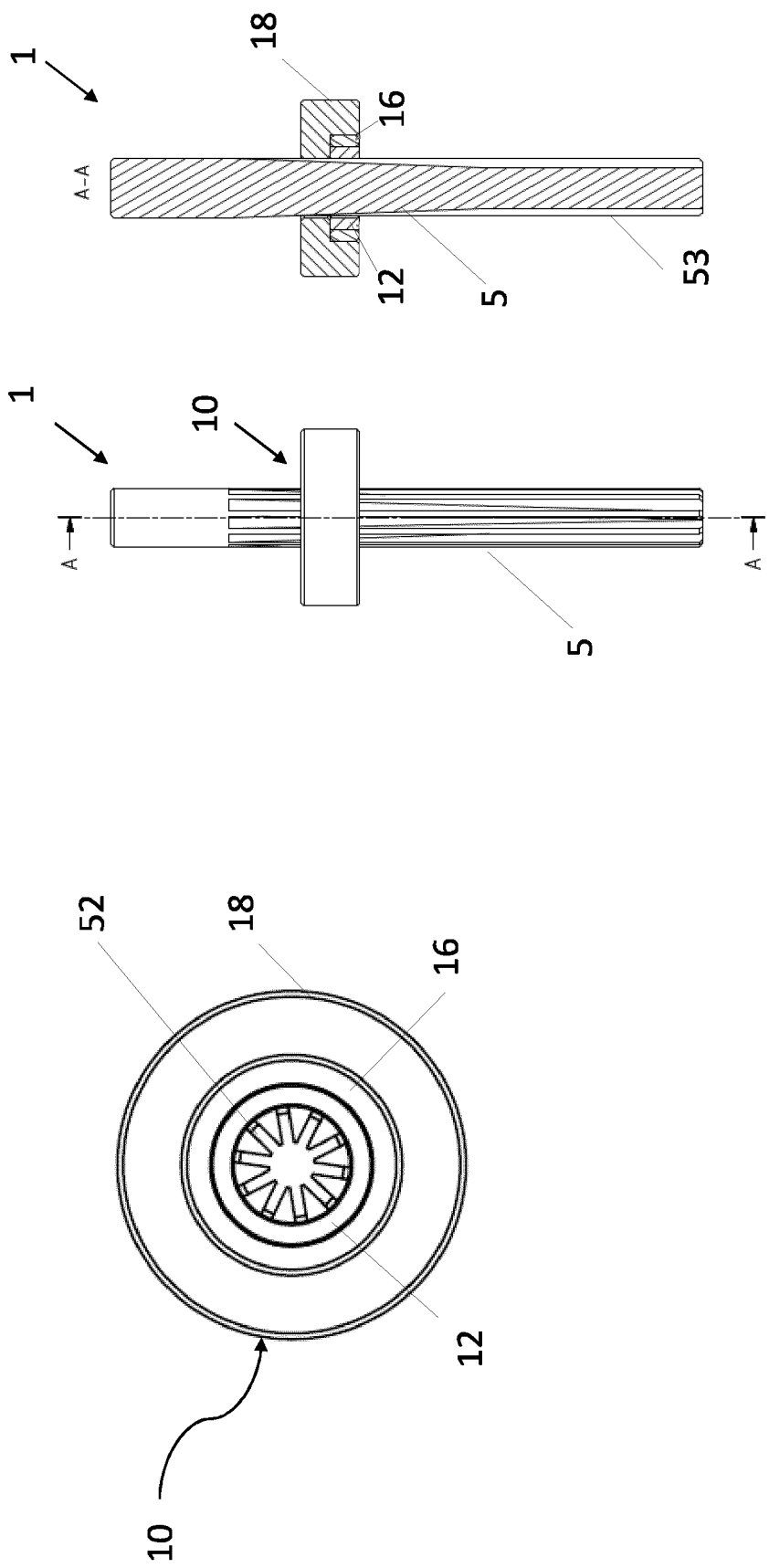
FIG. 3 schematically shows a hydraulic valve with a split ring assembly according to a further embodiment.

As shown in FIG. 1 to FIG. 3, a split ring assembly 10 for adjusting the throughput of a fluid of a hydraulic valve 1 comprising an elastomeric element 16 being adapted to mount a split ring 12 around the hydraulic ram 5 is shown. The elastomeric element 16 is arranged around the outward circumference of the split ring 12, wherein the throughput of the fluid is adjustable depending on the degree to which the throughput of hydraulic fluid is limited by the split ring 12.

In other words, the split ring and the outlet are positioned in such a way to each other that the hydraulic fluid flow is regulated by regulating the passage between the split ring 12 and the outlet of the hydraulic ram.

As shown exemplarily by the arrow in FIG. 1, the flow or throughput of hydraulic fluid is regulated by moving the split ring 12 in the longitudinal direction of the hydraulic ram 5 which regulates the throughput of hydraulic fluid in the hydraulic ram 5 comprising bores 51 for guiding hydraulic fluid. The split ring 12 is controlled such that it can regulate the targeted flow passing the bores 51.

The implementation of the elastomeric element 16 has the effect that the loads on the split ring 12 caused by passing over the pressurized bores 51 of the hydraulic ram 5 can be absorbed. Specifically, lateral movements or forces introduced on the split ring 12 and leading to wear and tear are absorbed by the elastomeric element 16.

Further, the split ring assembly 10 comprises a housing 18, wherein the elastomeric element 16 is arranged between the split ring 12 and the housing 18.

By this, the elastomeric element is mounted to the split ring in a secure manner. Further, the housing can be used for mounting the split ring assembly to a hydraulic machine in which the hydraulic valve may be implemented.

According to another aspect and exemplarily shown in FIG. 1, an hydraulic valve 1 comprising a split ring assembly 10 and a hydraulic ram 5 is provided, wherein the split ring assembly 10 is mounted around the hydraulic ram 5, wherein the degree of throughput of hydraulic fluid is adjustable depending on the degree to which the throughput of hydraulic fluid is limited by the split ring 12.

In an example, the split ring assembly 10 is movable and the hydraulic ram 14 is fixed, wherein the split ring assembly 10 is movable along the longitudinal axis L of the hydraulic ram 5 in a closing or at least partially closing position in order to fully close or at least partially close the flow of the hydraulic fluid or in an open position in order to enable a maximum throughput of the hydraulic fluid.

In this example, the split ring assembly 110 is movably mounted to the hydraulic ram 5 so that it can be moved along the longitudinal axis L of the hydraulic ram 5.

Alternatively, the split ring assembly 10 is fixed and the hydraulic ram 5 is movable along the longitudinal axis L of the hydraulic ram 5 to position the hydraulic ram 5 in relation to the split ring assembly 10 in a closing or at least partially closing position in order to fully close or at least partially close the throughput of the hydraulic fluid or in an open position in order to enable a maximum throughput of the hydraulic fluid. The split ring assembly 1110 may be fixed via the housing 18 to a hydraulic machine (not shown).

In this example, the split ring assembly 10 is mounted in a fixed manner and the hydraulic ram 5 is movable through the split ring assembly 10 to position the outlets in relation to the split ring 12 such that the hydraulic fluid flow passing the outlets is regulated.

In other words, the split ring 12 is positioned in relation to the outlets such that the hydraulic fluid throughput is limited, partially limited or not limited.

The split ring assembly 10 comprises the split ring 12 which is mounted by an elastomeric element 16 around the hydraulic ram 5 of the hydraulic valve 1. By this, lateral movements or forces introduced on the split ring during operation and leading to wear and tear are absorbed by the elastomeric element 16.

By this, a near wear free split ring assembly can be provided which improves the durability of the hydraulic valve 1. This can considerably increase the load cycles for the hydraulic valve operation. By this, the split ring 12 assembly is able to withstand at least 600.000 load cycles.

According to an embodiment shown in FIGS. 1 and 2, the hydraulic ram 5 is a pipe through which hydraulic fluid is guided, wherein the hydraulic ram 5 comprise at least one outlet, wherein the split ring assembly 10 is positioned over the outlet such that the throughput of the hydraulic fluid within the hydraulic ram 5 is adjustable.

In an example and shown in FIG. 1, the outlet is configured as multiple bores 51 being transverse in relation to the longitudinal axis L of the hydraulic ram 5. Preferably, the hydraulic ram comprise multiple bores 51 which are arranged circumferentially in the hydraulic ram 5. In this example, the hydraulic fluid is regulated by positioning the split ring 12 in the region of the bores 51. For example, if the split ring 12 is positioned over the bores (not shown), the bores are covered by the split ring and the valve is shut off. As shown in FIG. 1, the bores 51 are not covered and the hydraulic fluid is not limited by the split ring 12. Thus, the throughput of the hydraulic fluid is not limited at the shown position.

In a further example and shown in FIG. 2, the outlet is designed as a breakthrough 52 with a triangular shape. In this embodiment, the throughput of the hydraulic fluid can be regulated by positioning the split ring 12 along the longitudinal axis of the hydraulic ram 5 in the region of the breakthrough 52. The throughput of the hydraulic fluid is regulated depending on the position of the split ring 12 in relation to the breakthrough in the longitudinal direction of the hydraulic ram 5. For example, the triangular shaped breakthrough 52 can be designed as a pointed triangle wherein the apex of the triangle is lying in the same plane as the longitudinal axis L of the hydraulic ram 5. Thus, depending where the split ring 12 is positioned the throughput of the hydraulic fluid is regulated. For example, when the split ring 12 is positioned over the apex of the triangular shaped breakthrough 52 only a limited throughput of the hydraulic fluid is passed through the split ring 12. By this, the hydraulic fluid can be proportionally regulated in dependence on the position of the split ring 12 over the triangular shaped breakthrough 52.

According to a further embodiment shown in FIG. 3, the hydraulic ram is at least partially conically shaped with outwardly protruding ribs 53, wherein depending on the position of the split ring assembly 10 in the conically shaped region the throughput of the hydraulic fluid is adjustable.

In an example, the ribs 53 are arranged along the conically shaped part of the hydraulic ram 5 protruding outwardly so that the outer diameter of the hydraulic ram 5 is constant and adapted to the diameter of the split ring. Thus, the hydraulic ram 5 is not a pipe but the hydraulic fluid is guided through the ribs 53. Thus, the throughput of the hydraulic fluid being passed through the split ring 12 depends on the position of the split ring 12 within the conically shaped region of the hydraulic ram 5. For example, when the split ring 12 is positioned at a position where the inner diameter of the conically shaped is smallest the passage for the hydraulic fluid volume passing along the ribs 53 is greatest. Thus, the hydraulic fluid throughput guided through the split ring 12 is greatest. By this, the hydraulic fluid can be proportionally regulated in dependence on the position of the split ring 12 along the conically shaped region with outwardly protruding ribs 53 of the hydraulic ram 5.

In an example, the inner diameter of the split ring 12 and the outer diameter of the hydraulic ram 14 are adapted to each other so that there is a gap between the hydraulic ram 14 and the split ring 12 in order to allow leakage.

By allowing a controlled leakage between the split ring 12 and the hydraulic ram 5 being both metal parts the wear and tear of the split ring 12 is further prevented.

The hydraulic ram 14 is made of stainless steel, preferably X90CrMoV18.

Preferably, the elastomeric element 16 is designed as a ring.

According to a first aspect, a split ring assembly for adjusting the throughput of a fluid of a hydraulic valve comprising an elastomeric element being adapted to mount a split ring around a hydraulic ram, wherein the elastomeric element is arranged around the outward circumference of the split ring, wherein the throughput of the fluid is adjustable depending on the degree to which the throughput of hydraulic fluid is limited by the split ring.

The flow or throughput of hydraulic fluid is regulated by the split ring which regulates the throughput of hydraulic fluid in a hydraulic ram comprising outlets for guiding hydraulic fluid. The split ring is controlled such that it can regulate the targeted flow passing the outlets. The split ring is not a seal. It is a metal based element which is limiting the hydraulic flow guided by the hydraulic ram when positioned in the region of the outlets of the hydraulic ram.

The implementation of the elastomeric element has the effect that the loads on the split ring caused by the passing over the pressurized outlets of the hydraulic ram can be absorbed. Specifically, lateral movements or forces introduced on the split ring and leading to wear and tear are absorbed by the elastomeric element.

Further, the elastomer-mounted split ring allows increasing the tolerance range, because higher dimensional tolerances are compensated by the elastomeric element which leads to simplified manufacturing and reduced costs of the split ring assembly.

According to an embodiment, the split ring assembly comprises a housing, wherein the elastomeric element is located between the split ring and the housing.

By this, the mounting of the elastomeric element is securely fixed to the split ring. Further, the housing can be used for mounting the split ring assembly to the hydraulic machine.

The split ring and/or the housing is made of a brass alloy, preferably CuZn37Mn3Al2PbSi, or ceramic. It has been shown that this metal alloy particularly reduces wear.

According to another aspect, a hydraulic valve comprising a split ring assembly and a hydraulic ram is provided, wherein the split ring assembly is mounted around the hydraulic ram, wherein the degree of throughput of hydraulic fluid is adjustable depending on the degree to which the throughput of hydraulic fluid is limited by the split ring.

The split ring assembly comprises a split ring which is mounted by an elastomeric element around the hydraulic ram of the hydraulic valve. By this, a near wear free split ring assembly can be provided which improves the durability of the hydraulic valve. This can considerably increase the load cycles. By this, the split ring assembly is able to withstand at least 600.000 load cycles.

According to an embodiment, the hydraulic valve is configured so that the split ring assembly is movable and the hydraulic ram is fixed, wherein the split ring assembly is movable along the longitudinal axis of the hydraulic ram in a closing or at least partially closing position in order to fully close or at least partially close the throughput of the hydraulic fluid or in an open position in order to enable a maximum throughput of the hydraulic fluid through the hydraulic valve.

In another embodiment, the split ring assembly is fixed and the hydraulic ram is movable along the longitudinal axis of the hydraulic ram to position the hydraulic ram in relation to the split ring assembly in a closing or at least partially closing position in order to fully close or at least partially close the throughput of the hydraulic fluid or in an open position in order to enable a maximum throughput of the hydraulic fluid.

In this example, the split ring assembly is mounted in a fixed manner.

According to an embodiment, the hydraulic ram is a pipe through which hydraulic fluid is guided, wherein the hydraulic ram comprise at least one outlet, wherein the split ring assembly is positioned over the outlet such that the throughput of the hydraulic fluid within the hydraulic ram is adjustable.

In an example, the outlet is a bore being transverse in relation to the longitudinal axis of the hydraulic ram. Preferably, the hydraulic ram comprise multiple bores which are arranged circumferentially in the hydraulic ram. In this example, the hydraulic fluid is regulated by positioning the split ring in the region of the outlets. For example, if the split ring is positioned over the bores, the bores are covered by the split ring and the valve is shut off.

According to another embodiment, the outlet is designed as a breakthrough with a triangular shape.

According to another embodiment, the hydraulic ram is at least partially conically shaped with outwardly protruding ribs, wherein depending on the position of the split ring assembly within the conically shaped region of the hydraulic ram the throughput of the hydraulic fluid is adjustable.

According to embodiment, the inner diameter of the split ring and the outer diameter of the hydraulic ram are adapted to each other so that there is a gap between the hydraulic ram and the split ring in order to allow leakage.

According to an embodiment, the hydraulic ram is made of stainless steel, preferably X90CrMoV18.

According to an embodiment, the hydraulic fluid is water. The use of the elastomeric element in combination with the split ring enable an operation with water pressures of up to 600 bar in water hydraulic machines.

According to an embodiment, the elastomeric element is designed as a ring.

INDUSTRIAL APPLICABILITY

With reference to FIGS. 1 to 3, a split ring assembly and a hydraulic valve with such a split ring assembly for adjusting the throughput of a fluid of a hydraulic valve is suggested. The split ring assembly and the hydraulic valve as mentioned above are applicable in and in connection with (water) hydraulic machines, e.g. booster. The suggested split ring assembly and the hydraulic valve with such a split ring assembly may replace conventional hydraulic valves for c for adjusting the throughput of a fluid of a hydraulic valve.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

The invention claimed is:

1. A split ring assembly for adjusting the throughput of a fluid of a hydraulic valve, comprising an elastomeric element being adapted to mount a split ring around a hydraulic ram, wherein the split ring is disposed within a groove of a housing, the split ring extending the entirety of a length of the groove in a longitudinal direction, wherein the elastomeric element is arranged around the outward circumference of the split ring and between the split ring and the housing such that there is no gap between any of the split ring, the elastomeric element, and the housing, wherein the throughput of the fluid is adjustable depending on the degree to which the throughput of hydraulic fluid is limited by the split ring.

2. The split ring assembly according to claim 1, wherein the split ring and/or the housing is made of a brass alloy or ceramic.

3. An hydraulic valve comprising a split ring assembly according to claim 1 and a hydraulic ram; wherein the split ring assembly is mounted around the hydraulic ram; wherein the degree of throughput of hydraulic fluid is adjustable depending on the degree to which the throughput of hydraulic fluid is limited by the split ring.

4. The hydraulic valve according to claim 3, wherein the split ring assembly is movable and the hydraulic ram is fixed, wherein the split ring assembly is movable along the longitudinal axis of the hydraulic ram in a closing or at least partially closing position in order to fully close or at least partially close the flow of the hydraulic fluid or in an open position in order to enable a maximum throughput of the hydraulic fluid through the hydraulic valve, or wherein the split ring assembly is fixed and the hydraulic ram is movable along the longitudinal axis of the hydraulic ram to position the hydraulic ram in relation to the split ring assembly in a closing or at least partially closing position in order to fully close or at least partially close the flow of the hydraulic fluid or in an open position in order to enable a maximum throughput of the hydraulic fluid.

5. The hydraulic valve according to claim 3, wherein the hydraulic ram is a pipe through which hydraulic fluid is guided, wherein the hydraulic ram comprise at least one outlet, wherein the split ring assembly is positioned over the outlet such that the throughput of the hydraulic fluid within the hydraulic ram is adjustable.

6. The hydraulic valve according to claim 5, wherein the outlet is a bore being transverse in relation to the longitudinal axis of the hydraulic ram.

7. The hydraulic valve according to claim 5, wherein the outlet is designed as a breakthrough with a triangular shape.

8. The hydraulic valve according to claim 3, wherein the hydraulic ram is at least partially conically shaped with outwardly protruding ribs, wherein depending on the position of the split ring assembly in the conically shaped region the throughput of the hydraulic fluid is adjustable.

9. The hydraulic valve according to claim 3, wherein the inner diameter of the split ring and the outer diameter of the hydraulic ram are adapted to each other so that there is a gap between the hydraulic ram and the split ring in order to allow leakage.

10. The hydraulic valve according to claim 3, wherein the hydraulic ram is made of stainless steel.

11. The hydraulic valve according to claim 3, wherein the hydraulic ram is made of X90CrMoV18.

12. The hydraulic valve according to claim 3, wherein the hydraulic fluid is water.

13. The hydraulic valve according to claim 3, wherein the elastomeric element is designed as a ring.

* * * * *